Aug. 4, 1970 E. B. LEE ET AL 3,522,977
REPLACEABLE AND SELF-LUBRICATING BEARING ASSEMBLY
Filed July 8, 1968 4 Sheets-Sheet 1

INVENTORS
EMIL B. LEE
GERALD F. MOLLOY
BY
ATTORNEYS

Aug. 4, 1970   E. B. LEE ET AL   3,522,977
REPLACEABLE AND SELF-LUBRICATING BEARING ASSEMBLY
Filed July 8, 1968   4 Sheets-Sheet 2

INVENTORS
EMIL B. LEE
GERALD F. MOLLOY

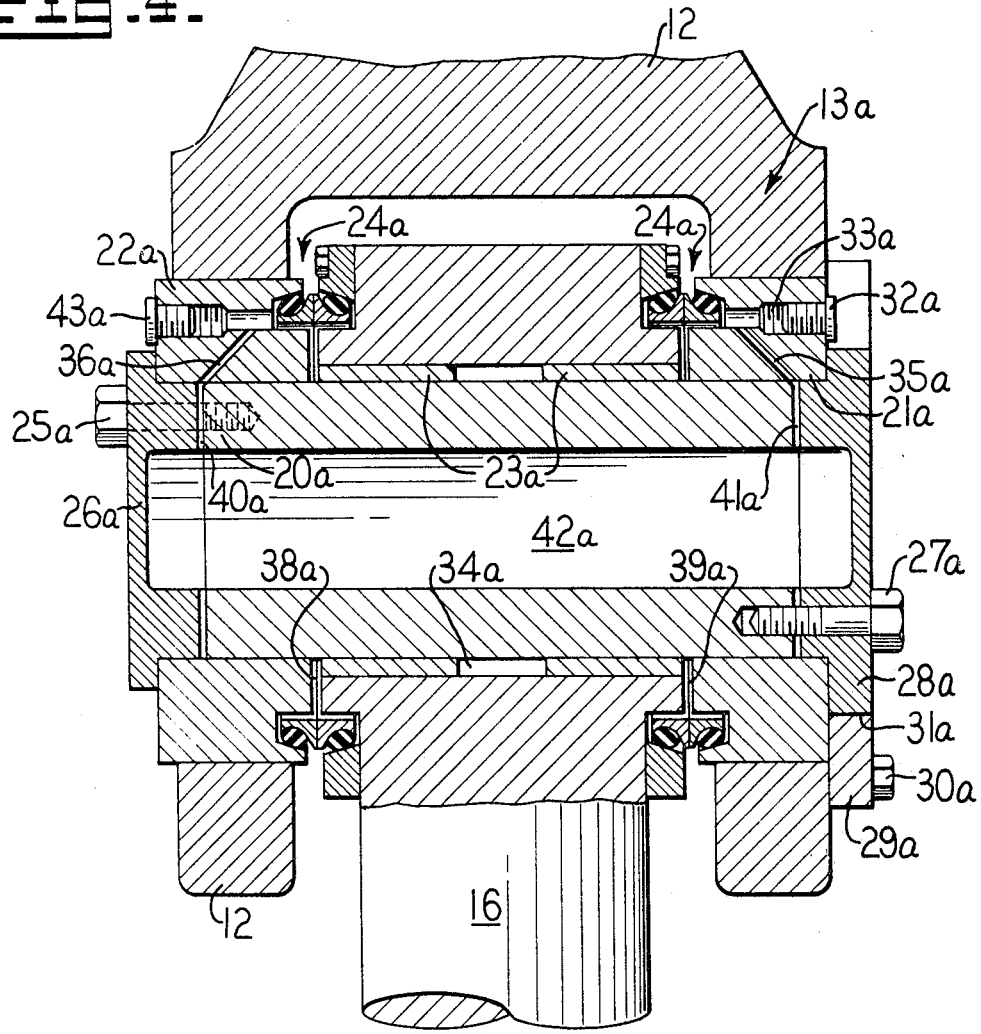

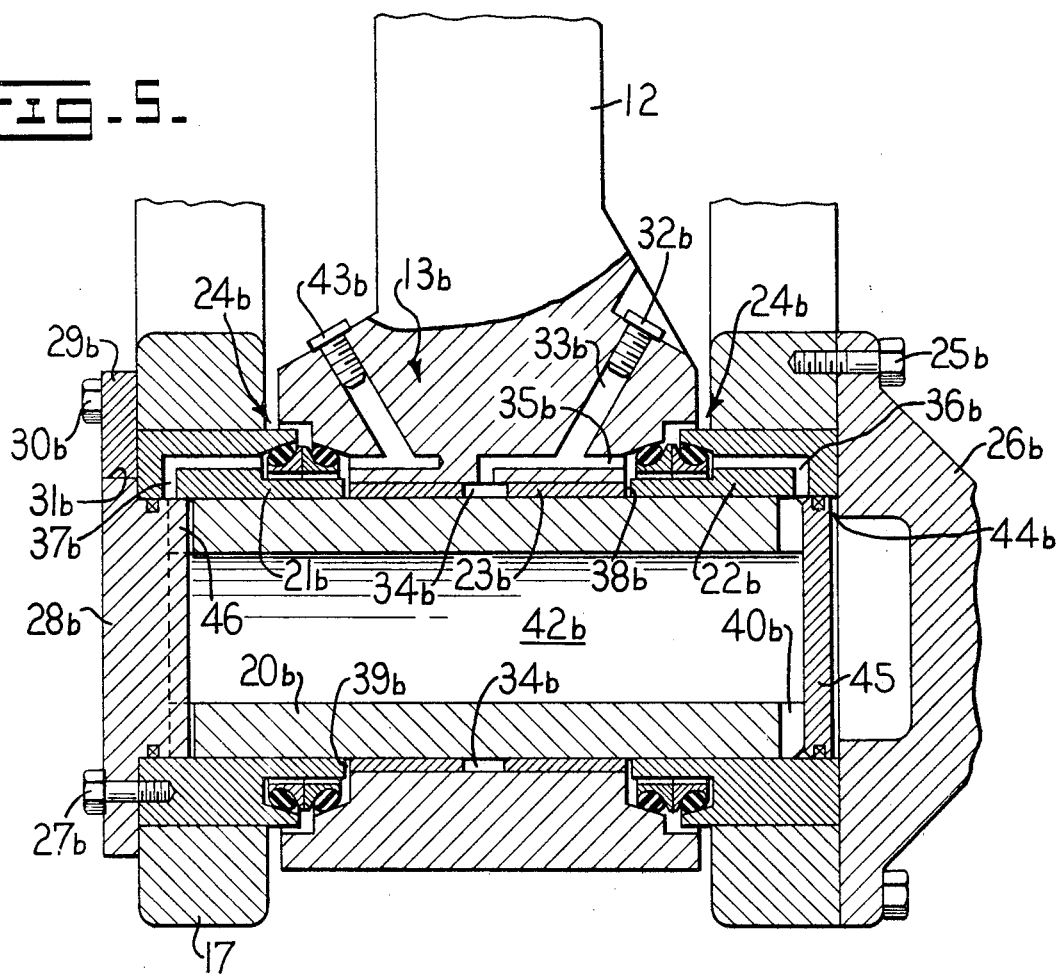

United States Patent Office 3,522,977
Patented Aug. 4, 1970

3,522,977
REPLACEABLE AND SELF-LUBRICATING BEARING ASSEMBLY
Emil B. Lee, Morton, and Gerald F. Molloy, Peoria, Ill., assignors to Caterpillar Tractor Co., Peoria, Ill., a corporation of California
Filed July 8, 1968, Ser. No. 743,237
Int. Cl. F16c 33/66
U.S. Cl. 308—78    21 Claims

ABSTRACT OF THE DISCLOSURE

A replaceable and self-lubricating bearing assembly comprises a tubular pin having a closed chamber formed therein for lubricating a bearing pivotally mounting first and second members of an integrated pivot assembly together. A removable filler plug is attached to the pivot assembly to permit a lubricant to be supplied to the chamber via passage means formed therein.

---

The need for periodic lubrication is a recurring problem inherently arising with the use of conventional bearings. The problem becomes acute when the bearings are incorporated in large earthmoving equipment which depend upon trouble-free operation and a limited amount of "shut-down" time for servicing and like purposes. An additional problem is one of expeditiously assembling and disassembling the bearings when replacement or repair thereof is required. As an example, a particular conventional bearing assembly weighing approrimately five hundred pounds requires a force approximating one hundred and fifty tons to press-fit the bearing assembly into place. Extended "shut-down" time for such lubrication and replacement purposes proves unduly expensive.

An object oft his invention is to overcome the above, briefly described problems by providing a bearing assembly which can be expeditiously replaced and lubricated to perform its intended function over a long period of time without further servicing. The bearing assembly of this invention essentially comprises a tubular pin having a lubricant retaining chamber formed therein. A bearing means is mounted on the pin and adapted to pivotally mount a member of an integrated pivot assembly thereon. A sleeve comprising first and second parts is also mounted on the pin to be separated by the bearing means and has another member mounted thereon so that the first-mentioned member pivots relative thereto. Passage means are formed in the bearing assembly to communicate the lubricant retaining chamber of the pin with the bearing means to constantly lubricate the bearing means when it is placed in operation.

Other objects of this invention will become apparent from the following description and accompanying drawings wherein:

FIG. 3 is an end elevational view of the bearing assembly taken in the direction of arrows 3—3, FIG. 2;

FIGS. 4 and 5 are cross-sectional views of further bearing assembly embodiments employed in the FIG. 1 wheel loader.

Figure 1:
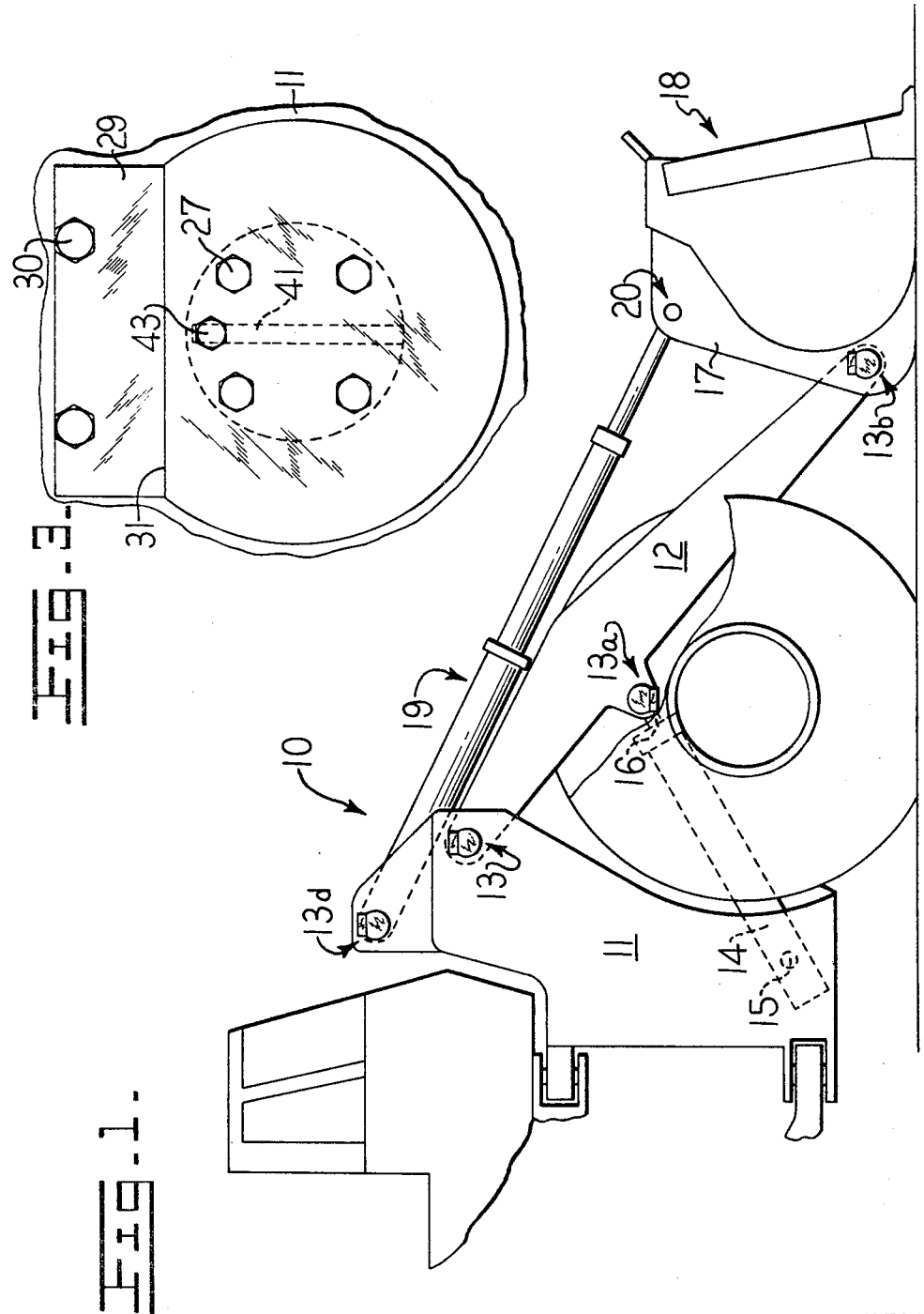
FIG. 1 is a side elevational view partially illustrating a wheel loader employing the replaceable and self-lubricating bearing assembly of this invention therein.

FIG. 1 partially illustrates a wheel loader 10 adapted to employ the replaceable and self-lubricating bearing assembly of this invention therein. The loader comprises an articulated frame 11 having a pair of spaced lift arms 12 each pivotally mounted thereon by a bearing assembly 13. Only one such lift arm and bearing assembly is illustrated in FIG. 1 although it should be understood that the FIG. 1 components are duplicated on the other side of the loader in a conventional manner. A lift cylinder 14 is pivotally mounted on the frame by a pivot pin 15 and has the end of a rod 16 thereof pivotally mounted to a mid-portion of the lift arm by a second bearing assembly embodiment 13a.

A third bearing assembly embodiment 13b pivotally mounts the free end of the lift arm to a bracket 17 of a bucket assembly 18. A tilt cylinder 19 is pivotally mounted at one end to the frame by a bearing assembly 13d. The latter bearing assembly may be identical to bearing assembly 13. The other end of the tilt cylinder is pivotally mounted to bracket 17 to selectively tilt the bucket relative to the lift arms in a conventional manner.

Figure 2:
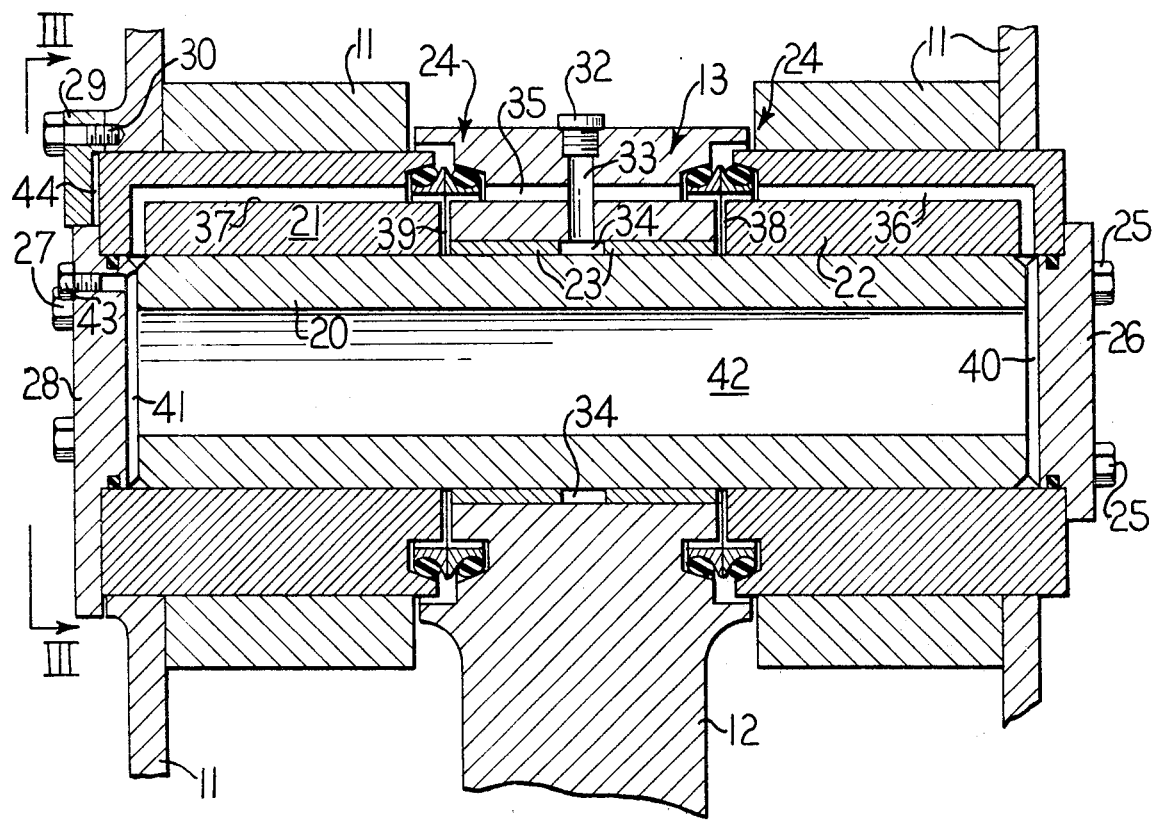
FIG. 2 is a cross-sectional view illustrating a first bearing assembly embodiment.

Referring to FIGS. 2 and 3, the first bearing assembly embodiment is shown integrated into a pivot assembly and comprises a tubular pin 20 supported in the bore of a cylindrical sleeve comprising spaced first and second parts 21 and 22, respectively. Each part is in turn slidably received in suitable bores formed in frame or first member 11 to maintain the sleeve and pin in concentric relationship therewith. A bronze or other suitably composed sleeve bearing 23 is positioned between the pin and a bore formed in lift arm 12 to provide bearing means for pivotally mounting lift arm or second member 12 relative to the integrated pin, sleeve and frame.

Two annular sealing means or floating metal ring seal assemblies 24, such as those disclosed in U.S. Pat. No. 3,180,648 assigned to the assignee of this application, are each suitably mounted between the lift arm and a respective sleeve part to prevent the lubricating fluid from escaping thereby. Bolts 25 attach a cover plate 26 to the right end of pin 20 whereas bolts 27 likewise secure a cover plate 28 to the left end thereof. As more clearly illustrated in FIG. 3, a lock bar 29 provides a locking means attached to frame 11 by bolts 30 to engage a flat surface portion 31 of cover plate 28 to prevent bearing assembly 13 from pivoting relative to the frame.

A filler plug 32 is removably attached to lift arm 12 to close a passage means comprising filler port 33 and attendant passages. The port communicates with an annular cavity 34 formed in sleeve bearing 23 to provide suitable lubrication therefore. If so desired the bearing may be formed in two parts which are suitably spaced axially to form the cavity therebetween. The port further communicates with an axial passage 35 formed in the lift arm which in turn communicates with passages 36 and 37 formed in sleeve parts 21 and 22.

Annular slots 38 and 39 are provided between each of sleeve parts and bearing 23 to assure full lubrication to the ends of the bearing. Vertically disposed slots 40 and 41 are formed on inner surface portions of plates 26 and 28, respectively, to communicate with a lubrication retaining chamber 42 formed in pin 20. Thus, removal of plug 32 will facilitate filling of the chamber with a lubricant via port 33, passages 35, 36 and 37 and slots 40 and 41. A vent plug 43 may be removed from plate 28 to purge the system of air when filling.

Assembly of the FIG. 2 integrated pivot and bearing assembly may be accomplished manually and without the use of special presses or the like as follows. Sleeve parts 21 and 22 are partially inserted into the mating bores of frame 11 and moved inwardly toward lift arm 12. Bearing 23 is inserted into the mating bore formed in the lift arm which is then positioned relatively to the frame, as shown in FIG. 2, so that pin 20 can be inserted through the mating bores of sleeve parts 21 and 22 and bearing 23. One-half of each of the seals 24 are properly positioned on the lift arm prior to such positioning of the lift arm relative to the frame.

The sleeve parts are then fully compressed towards the lift arm and each other until the other half of each seal 24 abuts and makes sealing contact with a respective first half thereof. Plates 26 and 28 are then attached to parts 22 and 21, respectively, and lock bar 29 is attached to the frame to prevent rotation of bearing assembly 13 relative to frame 11. It should be noted that such attachment of the plates automatically and properly positions the components of the bearing assembly and imparts the correct, predetermined preload force to seals 24.

Plate 28 abuts the frame at its lower end to prevent rightward movement of the bearing assembly. A clearance 44 is provided between lock plate 29 and sleeve part 21 to provide a suitable tolerance to compensate for the accumulated manufacturing discrepancies, for example. Lock plate 29 limits the leftward movement of the bearing assembly. When placed in operation it can be seen that lubricant is free to flow from chamber 42 and to bearing 23 and seals 24 via the passage means comprising slots 40 and 41, passages 36, 37 and 35, port 33 and slots 38 and 39.

Referring to FIG. 4, the second bearing assembly embodiment 13a is constructed and arranged to pivotally connect an eyelet portion of rod 16 to a bifurcated lug of lift arm 12. Arrangements in FIG. 4 corresponding to like numbered arrangements appearing in the FIGS. 1–3 embodiment have their numerals accompanied by a subscript a. A tubular pin 20a is fitted into aligned bores formed in sleeve parts 21a and 22a and sleeve bearing 23a. Sealing means 24a are constructed and arranged between rod 16, pivotally mounted on bearing 23a, and respective parts 21a and 22a of the sleeve.

Bolts 25a secure a cover plate 26a to one end of the pin whereas bolts 27a secure a cover plate 28a to the other end thereof. A lock plate 29a is attached to the lift arm by a bolt 30a to engage a flat portion 31a formed on cover plate 28a to prevent the bearing assembly from rotating relative to the lift arm. A removable filler plug 32a is attached to part 21a of the sleeve to expose a passage means comprising a chamber of port 33a for lubrication purposes. The port in turn communicates lubricating fluid to a chamber 42a via a passage 35a and a slot 41a formed in plate 28a.

Lubricating fluid is further communicated to one face seal 24a via annular slot 39a formed between part 21a and rod 16. Lubricating fluid from the chamber will be communicated through a slot 40a formed in cover plate 26a and passage 36a and to the other seal 24a. An annular slot 38a communicates such fluid to the other end of the bearing. A plug 43a is removably attached to sleeve part 22a to purge the system of air when chamber 42a is being filled.

FIG. 5 illustrates a third bearing assembly embodiment 13b having arrangements corresponding to identically numbered arrangements of the above described embodiments accompanied by subscripts b.

The free end of boom 12 is pivotally mounted to a bifurcated lug or extension of bracket 17 by means of bearing assembly 13b (FIG. 1). The assembly comprises a tubular pin 20b having parts 21b and 22b of a sleeve mounted thereon. The pin further mounts the one or two-part bearing sleeve 23b thereon to form a journal for the lift arm. Floating metal ring seal assemblies 24b are constructed and arranged between the respective sleeve parts and the lift arm to provide suitable sealing means thereat.

Bolts 25b secure a cover plate 26b to bracket 17 whereas bolts 27b secure a cover plate 28b to sleeve part 21b at the other end of the assembly. A lock plate 29b is attached to the bracket 17 by bolts 30b to engage a flat portion 31b formed on cover plate 28b to prevent rotation of the bearing assembly relative to the bracket.

A filler plug 32b normally closes a passage means comprising an inlet port 33b which communicates with an axially disposed passage 35b for lubricating purposes. The port further communicates with an annular cavity 34b and a passage 36b which in turn communicates with a chamber 42b via radially disposed ports 40b formed in the pin.

An annular plate 45 is preferably inserted into the right end of the bore of sleeve part 22b to seal the assembly at that end by means of an O-ring seal mounted on its periphery. A clearance 44b is provided between the plate and cover 26b to allow for a "stack-up" of manufacturing tolerances and to assure precise preload of seals 24b. A tang 46 is preferably formed on cover plate 28b to engage cutouts, similar to ports 40b, to prevent relative rotation from occurring between plate 28b and the pin.

It can be seen that when filler plug 32b is removed and the system is charged with lubricating fluid that such fluid will communicate along passages 35b, to one seal 24b and into chamber 42b via passage 36b and slot 40b. Lubricating fluid from the chamber will be communicated through a clearance provided between tang 46 and the cutouts and through passage 37b to the other seal 24b. A removable vent plug 43b is provided for air purging purposes.

What is claimed is:

1. A self-lubricating pivot assembly comprising a bearing assembly pivotally mounting first and second members together, said bearing assembly comprising a tubular pin having a large cylindrical and unobstructed lubricant retaining chamber formed therein, bearing means mounted on said pin pivotally mounting said second member thereon, a sleeve comprising first and second parts slidably mounted in mating bores formed in said first member and further slidably mounted directly on said pin and separated thereon by said bearing means and passage means formed in said bearing assembly and communicating the chamber of said pin with said bearing means to communicate lubricant thereto.

2. The invention of claim 1 wherein the first and second parts of said sleeve are each mounted between said pin and said first member.

3. The invention of claim 1 further comprising first and second sealing means positioned between said second member and the first and second parts of said sleeve, respectively, for preventing lubricant from escaping from said passage means.

4. The invention of claim 1 further comprising a filler plug removably attached to said pivot assembly for normally closing said passage means and adapted to be removed to charge the chamber of said pin with a lubricant via said passage means.

5. The invention of claim 4 wherein said filler plug is removably attached to said second member.

6. The invention of claim 4 wherein said filler plug is removably attached to one of the first and second parts of said sleeve.

7. The invention of claim 4 further comprising a vent plug removably attached to said pivot assembly for normally closing said passage means and adapted to be removed for venting air from said passage means and the chamber of said pin.

8. The invention of claim 1 further comprising first and second cover plates each attached to a respective end of said pivot assembly to close said chamber.

9. The invention of claim 8 wherein at least one of said first and second cover plates is attached directly to said pin.

10. The invention of claim 8 wherein at least one of said first and second cover plates is attached directly to said first member.

11. The invention of claim 8 further comprising locking means attached to said first member and engaging at least one of said first and second cover plates for preventing said pin from rotating relative to said first member.

12. The invention of claim 7 wherein said vent plug is attached to a cover plate attached to at least one end of said bearing assembly to close said chamber.

13. The invention of claim 7 wherein said vent plug is attached to one of the first and second parts of said sleeve.

14. The invention of claim 7 wherein said vent plug is attached to said second member.

15. The invention of claim 1 wherein said first member comprises a lift arm of a loader and said second member comprises the rod of an actuating cylinder thereof.

16. A replaceable bearing assembly adapted to pivotally mount two members together comprising a tubular pin having a large cylindrical and unobstructed lubricant retaining chamber of uniform cross-section formed therein, bearing means mounted on said pin, a sleeve comprising first and second parts mounted on said pin to be co-axial with and separated by said bearing means and passage means formed in said bearing assembly and communicating the chamber of said pin with said bearing means for supplying lubricant thereto, said passage means including a passage formed through each of the first and second parts of said sleeve for communicating lubricant to the ends of said bearing means.

17. The invention of claim 16 wherein said bearing assembly is incorporated into a pivot assembly comprising a first member mounted on said sleeve, a second member mounted on said bearing means to pivot relative to said first member and first and second sealing means positioned between said second member and the first and second parts of said sleeves, respectively, for preventing lubricant from escaping from said passage means.

18. The invention of claim 17 further comprising a filler plug removably attached to said pivot assembly for normally closing said passage means and adapted to be removed to charge the chamber of said pin with a lubricant via said passage means.

19. The invention of claim 18 further comprising a vent plug removably attached to said pivot assembly for normally closing said passage means and adapted to be removed for venting air from said passage means and the chamber of said pin after said chamber and passage means have been filled.

20. The invention of claim 16 further comprising first and second cover plates each attached to a respective end of said pivot assembly to close said chamber.

21. The invention of claim 17 further comprising locking means attached to said pivot assembly for preventing said pin from rotating relative to one of said first and second members.

References Cited

UNITED STATES PATENTS

| | | | |
|---|---|---|---|
| 1,251,965 | 1/1918 | Coatalen | 287—100 |
| 1,772,187 | 8/1930 | Manning | 287—96 |
| 1,795,069 | 3/1931 | Baker | 308—36.1 |
| 2,037,208 | 4/1936 | Buckwalter | 287—100 |
| 2,076,852 | 4/1937 | Leighton | 287—100 |
| 2,239,891 | 4/1941 | Horger | 308—78 |
| 2,418,901 | 5/1947 | Read | 308—78 X |
| 2,614,006 | 10/1952 | Bechman | 308—36.1 X |
| 2,884,273 | 4/1959 | Sznecer | 287—100 |
| 2,926,968 | 3/1960 | Toth | 308—108 X |
| 3,098,680 | 7/1963 | Lohman | 308—95 X |
| 3,129,966 | 8/1964 | Blank | 287—100 |
| 3,179,451 | 4/1965 | Blank | 287—100 |
| 3,210,137 | 10/1965 | Williams. | |
| 3,239,285 | 3/1966 | Madeira | 308—36.1 |
| 3,432,214 | 3/1969 | Cashman | 287—100 X |

FOREIGN PATENTS

| | | |
|---|---|---|
| 634,803 | 9/1936 | Germany. |
| 859,673 | 12/1940 | France. |

MANUEL A. ANTONAKAS, Primary Examiner

U.S. Cl. X.R.
287—100; 308—108